United States Patent
Reunamaki

(10) Patent No.: US 6,410,887 B1
(45) Date of Patent: Jun. 25, 2002

(54) METHOD FOR HEATING LOWE GLASS PANELS IN A TEMPERING FURNACE

(75) Inventor: Pauli Reunamäki, Tampere (FI)

(73) Assignee: Tamglass Ltd. Oy, Tampere (FI)

( * ) Notice: Subject to any disclaimer, the term of this patent is extended or adjusted under 35 U.S.C. 154(b) by 0 days.

(21) Appl. No.: 09/939,696

(22) Filed: Aug. 28, 2001

(30) Foreign Application Priority Data

Aug. 28, 2000 (FI) .................................................. 001890
Feb. 14, 2001 (FI) .................................................. 010275

(51) Int. Cl.$^7$ ...................... C03B 27/044; C03B 27/00; F27B 9/10
(52) U.S. Cl. .................... 219/388; 219/400; 65/114; 65/119
(58) Field of Search ................. 219/388, 400; 65/114, 119, 162; 432/144, 145

(56) References Cited

U.S. PATENT DOCUMENTS

| | | | |
|---|---|---|---|
| 4,390,359 A | | 6/1983 | Reunamäki |
| 4,505,671 A | | 3/1985 | McMaster |
| 4,529,380 A | | 7/1985 | McMaster |
| 4,824,464 A | * | 4/1989 | Perin et al. ................ 65/114 |
| 5,647,882 A | * | 7/1997 | Thiessen .................... 65/114 |
| 5,700,306 A | * | 12/1997 | Maltby et al. .............. 65/119 |
| 5,762,677 A | * | 6/1998 | Kormanyos ................ 65/119 |
| 6,050,814 A | * | 4/2000 | Lewandowski et al. ...... 65/119 |
| 6,064,040 A | * | 5/2000 | Muller et al. .............. 219/388 |
| 6,131,412 A | * | 10/2000 | Vehmas ...................... 65/162 |
| 6,155,822 A | * | 12/2000 | Lewandowski et al. ...... 65/119 |
| 6,282,923 B1 | | 9/2001 | Vehmas |

FOREIGN PATENT DOCUMENTS

| | | |
|---|---|---|
| EP | 0 897 896 A3 | 2/1999 |
| FI | 100596 | 1/1998 |
| WO | WO 98/01398 | 1/1998 |
| WO | WO 00/37371 | 6/2000 |

* cited by examiner

Primary Examiner—Joseph Pelham
(74) Attorney, Agent, or Firm—Burns, Doane, Swecker & Mathis, L.L.P.

(57) ABSTRACT

A method for heating LowE glass panels in a tempering furnace (1) provided with rollers. LowE glass panels are carried on a conveyor constituted by rollers (2) into the tempering furnace and then the discussed glass panels are set in an oscillating motion within the tempering furnace for the duration of a heating cycle. This is followed by delivering the discussed glass panels into a tempering station (3). In the tempering furnace, the glass panels are heated by means of top and bottom radiation heating elements (4, 5), as well as by top and bottom convection heating elements (6, 7). In the early stage of a heating cycle the top glass surface is subjected to convection heating more powerful than that applied to the bottom surface and in the final stage of a heating cycle the bottom glass surface is subjected to convection heating more powerful than that applied to the top surface.

10 Claims, 2 Drawing Sheets

METHOD FOR HEATING LOWE GLASS PANELS IN A TEMPERING FURNACE

Figure 1:
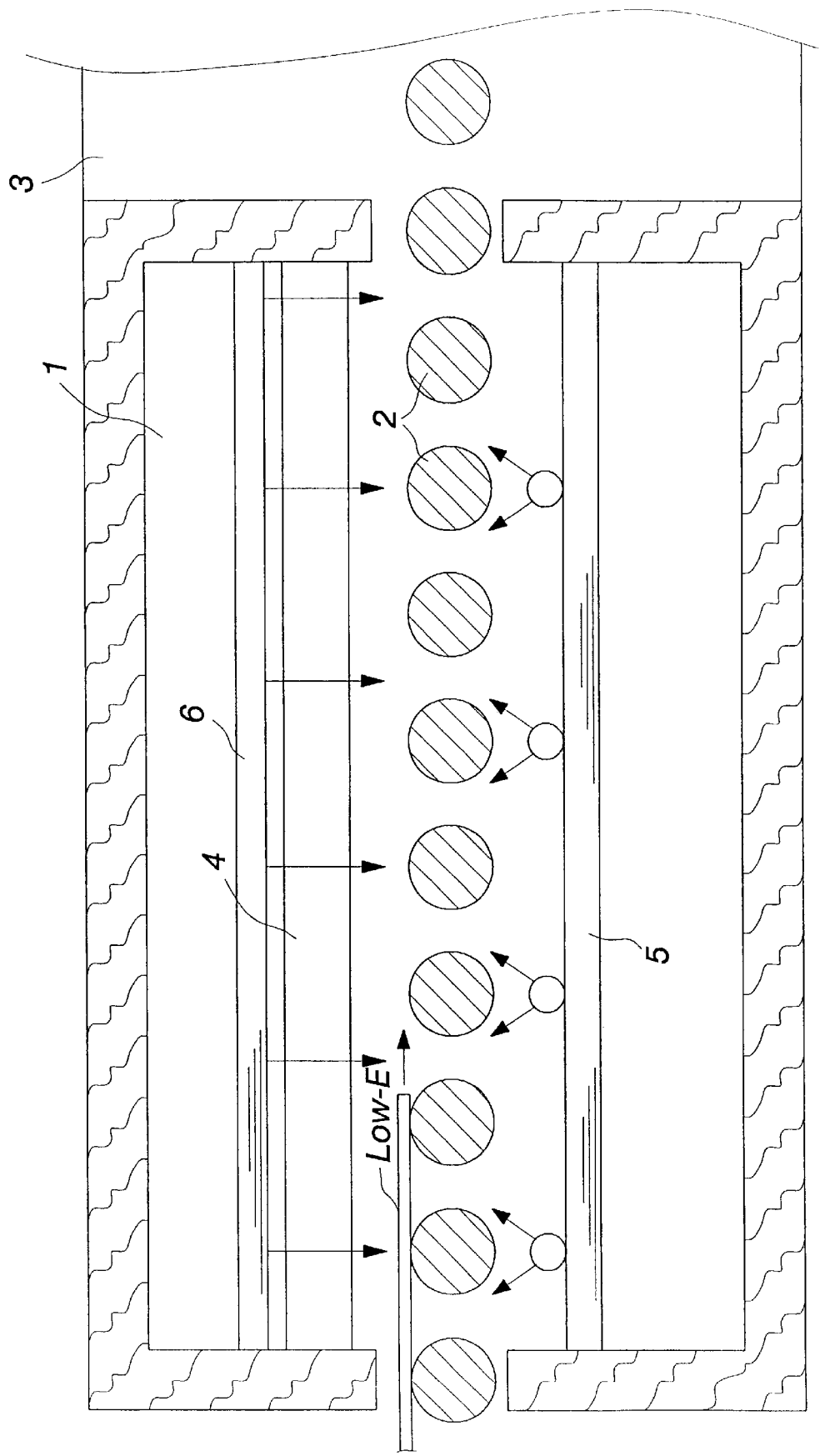

The invention relates to a method for heating LowE glass panels in a tempering furnace provided with rollers, said method comprising a transfer of LowE glass panels on a conveyor constituted by rollers into the tempering furnace and then setting the discussed glass panels in an oscillating motion within the tempering furnace for the duration of a heating cycle, followed by delivering the discussed glass panels into a tempering station, and the glass panels being heated in the tempering furnace by means of top and bottom radiation heating elements, as well as by top and bottom convection heating elements.

The tempering process of certain types of LowE glass presents a problem in terms of tempering. The side edges and ends of glass deflect to form a bend towards the coating side, i.e. the edges bend upwards on an unloading table. Indeed, the phenomenon is referred to as a frame effect. The bend develops in glass at the downstream and upstream ends at a distance of about 70 mm from the glass edge and along the sides of the glass at a distance of about 40 mm.

The discussed phenomenon occurs mainly on LowE glasses manufactured with a so-called APCVD-method (ATMOSPHERE PRESSURE CHEMICAL VAPOR DEPOSITION), wherein the coating of glass is performed in a furnace atmosphere. On the other hand, in glasses manufactured basically pyrolytically by using a CVD-method (CHEMICAL VAPOR DEPOSITION) the discussed problem hardly exists.

The coating of glass made with an APCVD-method has a thermal expansion coefficient which appears to be higher than that obtained by a pyrolytically conducted CVD-method. As a consequence, the behaviour of glass in a tempering furnace is as follows:

1) In the early stages of heating, the glass tends to bend with its edges upwards as the LowE coating on top blocks the impact of heat radiation on the glass, the bottom side of the glass becoming hotter than the top side to result in cambering. (It is prior known to compensate for this cambering by using overhead convection blasting as disclosed in Patent publication U.S. Pat. No. 4,390,359).

2) In the middle stages of heating, the higher thermal expansion coefficient of the coating enables the convection blasting to be dramatically reduced or even stopped. At this point, the temperature difference between glass surfaces is compensated for by a heat expansion of the colder top-side coating, which is based on said higher thermal expansion coefficient.

3) In the final stages of heating, the temperature difference between top and bottom glass surfaces decreases, yet the oppositely directed bending effect caused by heat expansion of the coating keeps increasing, with the consequence that the glass tends to bend with its edges downwards, i.e. travels upon its edges. However, since the glass has softened at a tempering temperature, and especially since the glass edges tend to overheat as a result of three-dimensional heating occurring along the edge, the edge zone of glass yields like "the paw of a cat", resulting in the abovementioned frame effect.

It is an object of the invention to provide a method capable of eliminating the occurrence of the above-mentioned frame effect.

This object is achieved on the basis of the characterizing features set forth in the appended claim 1. The non-independent claims disclose preferred embodiments of the invention.

Thus, according to the invention, it has been realized that, as the bottom side of a glass panel is subjected to powerful heating in the very final stage of a heating cycle, the bottom surface of the glass becomes hotter than the top surface, hence compensating for a cambering effect resulting from the higher thermal expansion coefficient of a LowE coating.

The prior known methods and furnace installations do not provide a solution to this problem, as apparent from the following review of patent publications describing the prior art.

U.S. Pat. No. 4,529,380 discloses a tempering furnace provided with convection blasting above and below a glass panel. According to the cited publication, the top convection or the bottom convection can also be used alone to provide a consistent temperature for maintaining the flatness of glass panels. The cited publication says nothing about the timing of top and bottom convection heating for various phases of a heating cycle. Neither does the cited publication discuss a problem regarding the heating of LowE glass panels, nor a discovery necessary for its solution, namely that the coating has a thermal expansion coefficient which is higher than that of the opposite surface of a glass panel. As a result of this, the sustenance of a consistent temperature between the top and bottom surfaces of a glass panel, as disclosed to be an objective in the cited publication, does not provide a solution to the discussed problem.

FI-1 00596discloses a heating method for glass panels, wherein the bottom surface of glass panels is heated with forced convection in the final stage of a heating cycle. This prior known method does not employ overhead convection, but, instead, the bottom section of a tempering furnace is cooled in the early stage of a heating cycle. In practice, this prior known method cannot successfully carry out the heating of LowE glass panels, since the coating is poor in terms of taking up radiation heat and, hence, the bottom cooling must be intensified to such a degree that the heating time becomes unreasonably long and the achievement of a temperature balance for a furnace becomes even otherwise more difficult, as the regulation of heating for a more slowly heating top surface can only be effected by radiation heat, which is substantially slower than convection heating in terms of adjustability.

Figure 2:
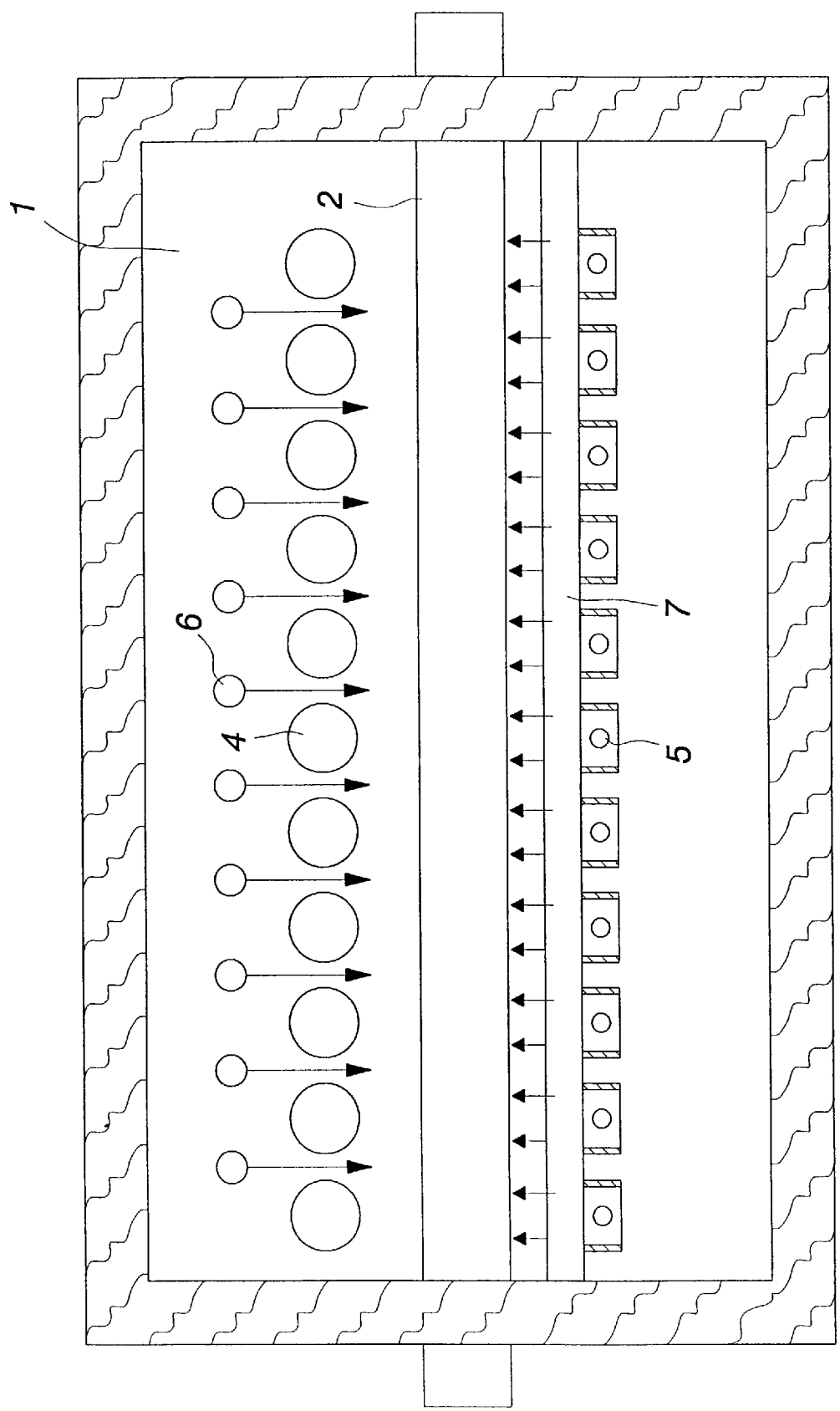

A method of the invention and optional implementations therefor will now be described in more detail with reference to the accompanying drawings, in which:

FIG. 1 shows a longitudinal section of a tempering furnace for implementing a method of the invention and FIG. 2 shows the furnace of FIG. 1 in a cross-section.

LowE glass panels are heated in a tempering furnace 1 provided with rollers 2, the LowE glass panels being transferred therein on a conveyor constituted by the rollers 2, whereby the glass panels are set in an oscillating motion within the tempering furnace 1 for the duration of a heating cycle. The heating cycle is followed by delivering the glass panels into a tempering station 3.

The tempering furnace 1 is fitted with upper or top radiation heating elements 4, comprising e.g. resistances lengthwise of the furnace, and with lower or bottom radiation heating elements 5, which may also be resistances lengthwise of the furnace. In addition, the tempering furnace is provided with overhead convection heating elements 6, which may comprise e.g. pipes lengthwise of the furnace, having the bottom surfaces thereof provided with orifices for directing blast air jets through gaps between the resistances 4 towards the top surface of a glass panel. Typically, the blast jets are directed vertically downward. The furnace is further provided with bottom convection heating elements 7, comprising preferably pipes transverse of the furnace and located below the rollers in a parallel relationship therewith and on the same vertical line as the rollers 2. By virtue of this disposition, the pipes 7 do not form an obstacle to pieces of glass possibly falling through the rollers. Each pipe 7 is provided with two rows of jet orifices in such an arrangement that the bottom convection blasting is directed diagonally upward towards intermediate spaces between the rollers 2.

The air for top and bottom convection blasting can be gathered as cold air from outside the furnace, whereby it can be preheated in a heat exchanger (not shown) with a substantially equivalent amount of hot air to be exhausted from the furnace. This way, the air to be blasted can be preheated e.g. to a temperature of 300–400° C. However, the amount of convection air to be blasted is so small that the desired convection-boosting heating effect is obtained even without preheating. The mixing ratio of blast air to furnace air prior to air hitting the surface of a glass panel is in the order of 100, wherefor its cooling effect on the temperature of air hitting the surface of a glass panel is quite insignificant in comparison with the increase of heat transfer coefficient provided by convection effect.

The inventive method is not limited to the above-described exemplary embodiment, which is provided with radiation heating resistances. The furnace may also be an outright convection furnace, wherein the substantial heating of glass panels is effected by means of top and bottom convection heating elements 6, 7. In this case, the pressurization and heating of a heating gas to be blasted from the convection blasting pipes 6 and 7 can be performed e.g. by burning gas in a jet turbine type apparatus.

In the process of heating Low-E glasses, the heating of opposite glass surfaces and the variation of a temperature balance between the top section and the bottom section of a furnace can be taken into account by adjusting the power and duration of top and bottom convection heating blasts. In a preferred embodiment of the invention, the convection applied to the top glass surface in the early stage of a heating cycle has a heat transfer coefficient which is lower than that of the convection applied to the bottom glass surface in the final stage of a heating cycle. This is achieved by regulating the blasting pressure and/or the volume flow of blasting jets. On the other hand, it is preferred that the top convection heating blast, which is lower in terms of its heat transfer coefficient, be applied for a longer period than the bottom convection heating blast. The convection applied to the top glass surface in the early stage of a heating cycle has a duration which is preferably more than 2 times longer than that of the convection applied to the bottom glass surface in the final stage of a heating cycle. The convection applied to the top glass surface in the early stage of a heating cycle has a duration which is 35%–60%, preferably 40%–55%, typically in the order of about 50% of the duration of a heating cycle. The convection applied to the bottom glass surface in the final stage of a heating cycle has a duration which is 20%–5%, preferably 15%–7%, and typically in the order of about 10% of the duration of a heating cycle.

What is claimed is:

1. A method for heating LowE glass panels in a tempering furnace (1) provided with rollers, said method comprising a transfer of LowE glass panels on a conveyor constituted by rollers (2) into the tempering furnace and then setting the discussed glass panels in an oscillating motion within the tempering furnace for the duration of a heating cycle, followed by delivering the discussed glass panels into a tempering station (3), and the glass panels being heated in the tempering furnace by means of top and bottom radiation heating elements (4, 5), as well as by top and bottom convection heating elements (6, 7), characterized in that in the early stage of a heating cycle the top glass surface is subjected to more powerful convection heating than the bottom surface, and in the final stage of a heating cycle the bottom glass surface is subjected to more powerful convection heating than the top surface.

2. A method as set forth in claim 1, wherein the early stage of a heating cycle the convection heating is only applied to the top glass surface.

3. A method as set forth in claim 1, wherein the final stage of a heating cycle the convection heating is only applied to the bottom glass surface.

4. A method as set forth in claim 1, wherein the main heating of glass panels is effected by means of top and bottom convection heating elements (6, 7).

5. A method as set forth in claim 1, wherein the bottom convection blast is effected from the pipes (7), located below the rollers (2) and on the same vertical line as the rollers, diagonally upwards toward intermediate spaces between the rollers (2).

6. A method as set forth in claim 1, wherein the air for top and bottom convection blast is gathered from outside the furnace and preheated in a heat exchanger with a substantially equivalent amount of air to be exhausted from the furnace.

7. A method as set forth in claim 1, wherein the convection applied to the top glass surface in the early stage of a heating cycle has a heat transfer coefficient which is lower than that of the convection applied to the bottom glass surface in the final stage of a heating cycle.

8. A method as set forth in claim 1, wherein the convection applied to the top glass surface in the early stage of a heating cycle has a duration which is more than 2 times longer than that of the convection applied to the bottom glass surface in the final stage of a heating cycle, the latter being 20%–5% of the duration of a heating cycle.

9. A method as set forth in claim 8, wherein the convection applied to the top glass surface in the early stage of a heating cycle has a duration which is 35%–60% preferably 40%–55% of the duration of a heating cycle.

10. A method as set forth in claim 9, wherein the convection applied to the bottom glass surface in the final stage of a heating cycle has a duration which is 15%–7%, preferably about 10% of the duration of a heating cycle.

* * * * *